Figure 1:
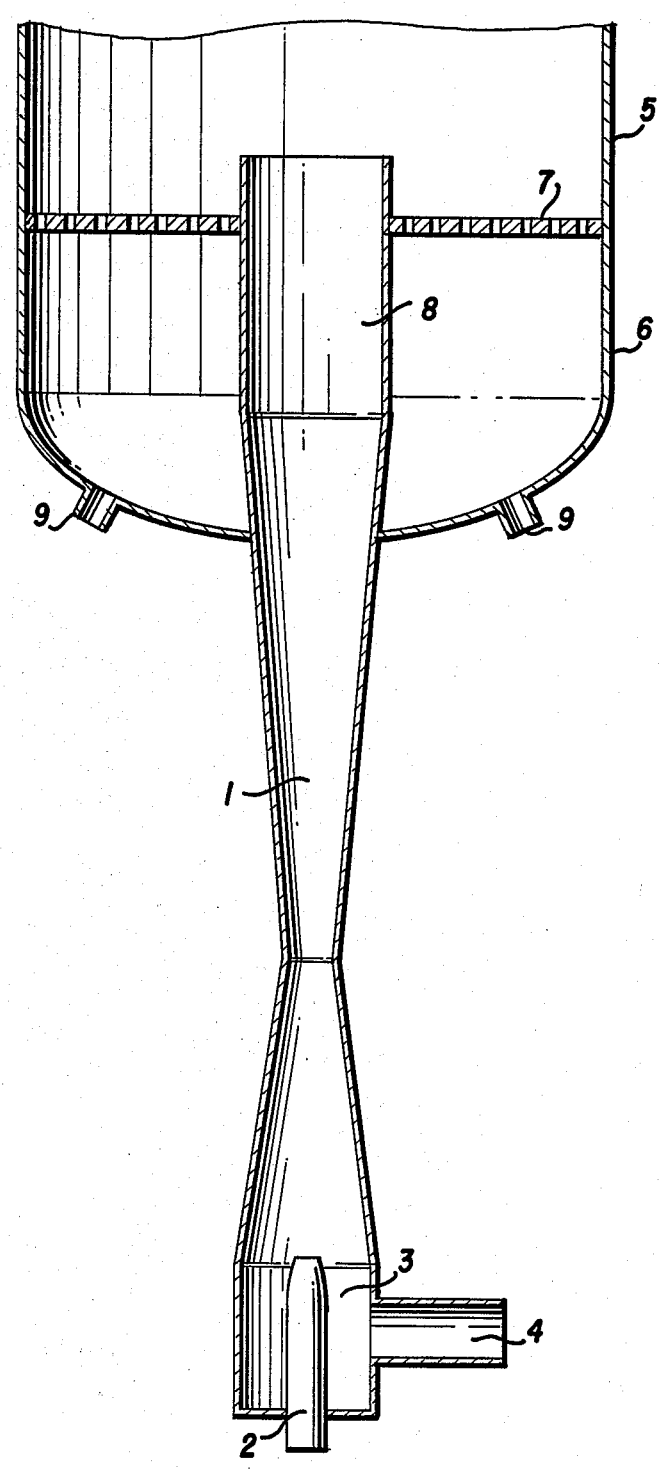

United States Patent [19]

Cortesi et al.

[11] Patent Number: 4,574,078

[45] Date of Patent: Mar. 4, 1986

[54] PROCESS AND APPARATUS FOR PREPARING MONODISPERSED, SPHERICAL, NON-AGGLOMERATED METAL OXIDE PARTICLES HAVING A SIZE BELOW ONE MICRON

[75] Inventors: Paolo Cortesi, Chivasso; Gianni Donati, Rho; Giuseppe Saggese, Novara, all of Italy

[73] Assignee: Montedison S.p.A., Milan, Italy

[21] Appl. No.: 582,546

[22] Filed: Feb. 22, 1984

[30] Foreign Application Priority Data

Feb. 25, 1983 [IT]  Italy ............................... 19819 A/83

[51] Int. Cl.$^4$ ............................................. C01G 31/02
[52] U.S. Cl. ..................... 423/592; 423/610; 423/607; 423/608; 423/625; 423/630; 423/632
[58] Field of Search ................ 106/299, 304; 423/592, 423/607, 608, 610, 611, 612, 613, 628, 632; 502/407, 415

[56] References Cited

U.S. PATENT DOCUMENTS

| | | | |
|---|---|---|---|
| 1,842,620 | 1/1932 | McInerny et al. ................ | 423/613 |
| 1,967,235 | 7/1934 | Ferkel ................................ | 423/613 |
| 2,347,496 | 4/1944 | Muskat et al. ..................... | 423/607 |
| 2,776,188 | 1/1957 | Gilbert .............................. | 106/299 |
| 3,297,414 | 1/1967 | Mazdiyasni et al. .............. | 423/608 |
| 3,954,945 | 5/1976 | Lange et al. ...................... | 423/592 |
| 4,241,042 | 12/1980 | Matijevic et al. ................. | 423/610 |

FOREIGN PATENT DOCUMENTS 0067005 12/1982  European Pat. Off. .

OTHER PUBLICATIONS

*Advanced Inorganic Chemistry,* Cotton & Wilkinson, 1972, pp. 264, 265, and 272, Interscience.
*Momentum, Heat, and Mass Transfer,* Bennett and Myers, p. 18, McGraw-Hill 1974.

*Primary Examiner*—Herbert T. Carter
*Attorney, Agent, or Firm*—Stevens, Davis, Miller & Mosher

[57] ABSTRACT

Spherical, submicronic, monodispersed, and non-agglomerated particles of metal oxides by reacting with steam a gaseous stream containing an aerosol of liquid particles of a hydrolyzable metal compound. Into a duct, in which an inert gas stream containing vapors of a hydrolyzable metal compound flows, there is fed through a nozzle a cold inert gas stream, the temperatures and flows of the two gaseous streams being such as to establish in the duct a temperature lower than the condensation temperature of the metal compound; the mixed gaseous streams having a turbulent flow in the duct, with a Reynolds number equal to or higher than 1800. At the duct outlet, the aerosol of metal compound liquid particles, which has formed in the duct, is caused to react with steam, wherefore solid particles of hydrated metal oxide form, which are subsequently calcined to the oxide.

8 Claims, 1 Drawing Figure

PROCESS AND APPARATUS FOR PREPARING MONODISPERSED, SPHERICAL, NON-AGGLOMERATED METAL OXIDE PARTICLES HAVING A SIZE BELOW ONE MICRON

The present invention relates to a process and an apparatus for preparing monodispersed, spherical, non-aggregated metal oxide particles having an average size below one micron. More particularly, the invention relates to a process and an apparatus for preparing such particles of metal oxides, in particular, $TiO_2$, $Al_2O_3$, $ZrO_2$, $Cr_2O_3$, $V_2O_5$, $Ga_2O_3$ and $Fe_2O_3$, starting from metal compounds hydrolyzable to hydrated oxides by reaction with steam.

The titanium dioxide produced as spherical, submicronic, non-agglomerated and narrow-dispersed particles has a wide range of sophisticated uses. Being endowed with such characteristics which impart excellent optical and pigmentary properties to it, the titanium dioxide is employable in the electrophoretic image display where the particles' uniform dimensions permit one to obtain fully stable colloidal suspensions, without variations in the concentration due to different sedimentation rates of said particles.

A powder of monodispersed $TiO_2$ is utilized also in the manufacture of sintered materials, particularly in the field of ceramics, as it permits one to reduce the sintering temperature and time, while increasing materially the mechanical strength.

Further possible special utilizations are those in photography, electronics, etc., which concern also other types of metal oxides, such as $Al_2O_3$, $ZrO_2$, etc.

Various methods of producing $TiO_2$ and other metal oxides of spherical form and with narrow granulometric distribution are known at present. To these methods belong:

the hydrolysis of $TiCl_4$ solutions at high temperature, in the presence of $H_2SO_4$;
the decomposition of chelated compounds in strongly saline solutions;
the phase transformation and recrystallization of a metal oxide.

These methods have the drawback of having a low productivity and of providing agglomerated and not always spherical particles.

Spherical, submicronic, non-agglomerated $TiO_2$ particles having a narrow granulometric distribution are obtained according to U.S. Pat. No. 4,241,042. According to the process of that patent, there is formed an aerosol of a hydrolyzable liquid titanium compound in a gaseous stream with laminar flow, and this stream is reacted with steam, whereby particles of hydrated $TiO_2$ are obtained, which are then calcined. The best results are obtained, with this process, by using a solid nucleating agent as a nucleus for the condensation of the liquid particles of hydrolyzable titanium compound. It is therefore recommended, in this process, to install a generator of solid nuclei.

It is an object of the present invention to provide a simple process which does not require the generation of solid nuclei for preparing monodispersed, spherical, non-agglomerated metal oxide particles having sizes below one micron.

Another object is to provide a process which may be easily adopted on a commercial scale.

Another object is to provide an apparatus suitable for conducting such process.

The two first objects and still other objects are achieved by the process of the present invention for obtaining spherical, submicronic, monodispersed and non-aggregated particles of metal oxides by reacting with steam a gaseous stream containing an aerosol of liquid particles of a hydrolyzable metal compound. This process is characterized in that into a duct in which an inert gas stream containing vapors of a hydrolyzable metal compound flows, there is fed, through a nozzle, a cold inert gas stream, the temperatures and flow rates of the two gaseous streams being such as to establish in the duct a temperature lower than the condensation temperature of the metal compound; the mixed gaseous streams undergo turbulent flow in the duct, with a Reynolds number equal to or higher than 1800; at the duct outlet the aerosol of liquid particles of the metal compound, which has formed in the duct, is reacted with steam, wherefore solid particles of hydrated metal oxide form which are subsequently calcined to oxide.

The term "inert gas" in the context of the present invention means a gas which does not react with the hydrolyzable metal compound. Suitable gases are, for example, air and nitrogen. Of course, it is necessary for the gas to be dry in order to prevent an unwanted reaction between the metal compound and steam.

The inert gas stream containing the metal compound vapors is obtainable according to per se known methods. It is possible to form an aerosol of liquid droplets of the metal compound in the inert gas, for example, by means of a two-fluid nebulizer, and to successively evaporate the aerosol by heating the gas stream. It is also possible to boil under vacuum the metal compound and to entrain the vapors with a hot inert gas stream. It is preferable to form an aerosol of the metal compound in the inert gas stream, such aerosol being then evaporated before conveying the stream into the duct.

Preferably, the hydrolyzable metal compound is a Ti, Al, Zr, Cr, V, Ga or Fe compound and, more preferably, a compound of Ti, Al or Zr.

Among the metal compounds hydrolyzable with steam, there may be cited, for example:
for titanium: titanium isopropyl, titanium ethoxide, and titanium tetrachloride;
for aluminum: aluminum sec. butoxide, aluminum ter. butoxide, aluminum n-butoxide, and aluminum isobutoxide;
for zirconium: isopropylzirconate and zirconium n-propoxide.

For the other metals, similar compounds may be used.

The temperature of the cold gas stream is such, taking into account the temperature of the gas stream containing the metal compound vapors as well as the flow rate of the two gas streams, that the temperature in the duct is lower than the condensation temperature of the metal compound vapors. The process is operated in such a way as to have in the duct a Reynolds number equal to or higher than 1800. In the duct, the turbulence is high, even for $R_e$ values equal to or slightly higher than 1800, and the mixing of the streams, with formation of the aerosol, occurs rapidly in the duct.

The Reynolds number in the duct is usually higher than 2000. The higher value of the Reynolds number may be 100,000 and above; more usually, such higher value is of the order of about 10,000.

The choice of the temperature at which the condensation must take place in order to obtain the desired monodispersed product is critical; it is to be experimentally determined for each metal compound, also as a function of its concentration in the carrying gas in the duct.

In the case of isopropyltitanate, the condensation temperature must not be higher than 100° C. Good results are obtained, for example, by operating from a temperature of 40° C. to a temperature of 100° C. In the case of aluminum sec. butoxide and isopropylzirconate, one operates generally at a temperature between 50° and 120° C. An aerosol of spherical, submicronic, monodispersed, and non-aggregated metal compound droplets flows out from the duct; such properties of the droplets remain unaltered in the solid particles of hydrated metal oxide obtained after the hydrolysis and in the solid particles of metal oxide obtained after calcination.

Steam can be introduced as such or in a third gas stream consisting, for example, of air or nitrogen. In the latter case it is possible, for example, to form, by means of a nebulizer, an aerosol of water droplets in a gas stream and to successively evaporate the water by heating the stream.

Preferably, the duct is an ejector and, in such case, the inert gas stream containing the hydrolyzable metal compound vapors is fed into the ejector chamber, while the cold inert gas stream is fed into the ejector nozzle. The Reynolds number values defined hereinbefore refer to the convergent portion of the ejector. In the case of an ejector, mixing of the gaseous streams, with formation of the aerosol, occurs rapidly within said ejector, prevailingly or entirely in its convergent portion.

The hydrolysis temperature is not critical: it is possible to operate, for example, between 25° and 70° C. Optionally, at least the lower portion of the hydrolysis chamber may be cooled. Since the section of the hydrolysis chamber is greater than the section of the duct or of the ejector, the gas flow in the hydrolysis chamber rapidly becomes laminar (with $R_e$ ranging, for example, from 100 to 500). This reduces the risk of coalescence for the droplets coming from the duct or from the ejector.

Steam is preferably fed to the hydrolysis chamber in considerable excess with respect to the hydrolysis reaction stoichiometry: for example, amounts of water corresponding from 1.5 to 12 times the stoichiometric ratio are used.

The hydrolysis chamber volume, taking into account the total flowrate of the gases, is selected in such a way that the contact time between the hydrolyzable compound particles and the steam may ensure a complete hydrolysis, even inside the particles. One may use, e.g., a contact time between 25 and 50 seconds.

The metal oxide particles are separable from the gas stream either before or after calcination. If the separation occurs before the calcination, it is advisable to heat the gaseous stream, e.g., to a temperature from 100° to 140° C., in order to favor the completion of hydrolysis inside the already-formed solid particles, and to dry them prior to separation. Separation may be accomplished, for example, in cyclones, on filters, or by electrostatic deposition. Calcination after separation may be carried out, for example, in a static furnace: a calcination temperature suitable for obtaining $TiO_2$ anatase in a static furnace ranges, e.g., from 540° to 580° C. If the separation occurs after the calcination, then the calcination takes place in the gaseous stream itself.

The invention relates also to an apparatus for the production of spherical, submicronic, monodispersed and nonaggregated particles of metal oxides.

The apparatus, schematically shown in the accompanying FIG. 1, is characterized in that it consists of a convergent-divergent ejector 1, ending with a cylindrical portion 8 which coaxially penetrates into the curved bottom 6 of a cylindrical chamber 5, the diameter of which is at least twice the diameter of the ejector cylindrical portion 8.

The curved bottom 6 of the cylindrical chamber is surmounted by a drilled plate 7, through which the end of the ejector's cylindrical portion 8 passes coaxially.

A cold inert gas stream is fed to the ejector's nozzle 2.

An inert gas stream 4 containing hydrolyzable metal compound vapors is fed to the ejector's chamber 3.

The curved bottom 6 of the cylindrical chamber 5 is provided with one or more holes 9 for the inflow of steam.

Downstream of the cylindrical chamber 5, the apparatus ends with a conventional device (not shown in the FIGURE) for separating the hydrated metal oxide from the gaseous stream, and with a conventional furnace (not shown in the FIGURE) for calcining the hydrated metal oxide to metal oxide.

The ratio between the diameter of the cylindrical chamber 5 and the diameter of the cylindrical portion 8 of the ejector usually ranges from 2 to 15.

A variant of the apparatus consists in that the furnace for calcining the hydrated metal oxide carried by the gaseous stream is arranged upstream of the device for separating the oxide from the stream.

EXAMPLE 1

The apparatus shown in FIG. 1 was utilized to prepare a $TiO_2$ powder. The ejector had the following characteristics: nozzle diameter = 3 mm; ejector chamber diameter = 14 mm; throttling diameter = 5 mm; diameter of the divergent portion upper end = 15 mm; length of the convergent portion = 55 mm; length of the divergent portion = 60 mm; length of the cylindrical portion = 30 mm.

The hydrolysis chamber had an inside diameter of 90 mm and a volume of 14 liters.

Air was used as the carrying gas. Isopropyltitanate was employed as the titanium compound. In a dry air stream with a flow rate of 390 l/h (measured at room temperature), an isopropyltitanate aerosol was produced by means of a two-fluid nebulizer. The aerosol was then evaporated by externally heating the air stream. Before entering the ejector chamber, the stream temperature was 165° C.

A second dry air stream with a flow rate of 580 l/h (measured at room temperature) was cooled to +2° C. before entering the ejector nozzle.

The temperature at which the aerosol formed in the ejector was about 65° C., while the Reynolds number in the ejector convergent portion was about 3,000.

In a third air stream with a flow rate of 705 l/h (measured at room temperature), a distilled water aerosol was produced by means of a two-fluid nebulizer. The aerosol was then evaporated by externally heating the air stream prior to its entering the hydrolysis chamber. This stream enters the apparatus at a temperature of about 120° C.

In the hydrolysis chamber, the contact time was about 30 seconds and the $$\frac{\text{moles of water}}{\text{moles of isopropyltitanate}}$$

ratio was approximately 8.

The gaseous stream leaving the hydrolysis chamber was externally heated to about 120° C. and the hydrated titanium oxide was separated in three cyclones arranged in series.

The product, examined under the electron microscope, revealed the following particle size characteristics:

$D_n$ (average linear diameter): 0.82 μm
$\delta$ (standard deviation): 0.12
$\delta/D_n$ (dispersion degree): 0.15
$D_w/D_n$ (polydispersion index): 1.07

These values and the method of determining same are described by Edward A. Collins, John A. Davidson and Charles A. Daniels, "Review of Common Methods of Particles Size Measurement", *Journal of Paint Technology*, Vol. 47, No. 604, May 1975.

The particles were perfectly spherical, non-agglomerated, and water-dispersible.

The yield was about 30%, determined on titanium (the rest having escaped the cyclones). If a more efficient separation method had been used (e.g., an absolute membrane filter), the yield would probably have been of the order of about 90%. The productivity was approximately 4 g/h of hydrated $TiO_2$.

By calcining the hydrated $TiO_2$ in a static furnace at 560° C., $TiO_2$ anatase with unchanged particle size characteristics was obtained.

EXAMPLE 2

The same procedures of Example 1 were followed, with the five exceptions specifically described hereinafter:

The first gaseous stream (air+isopropyltitanate) had a flow rate of 300 l/h (measured at room temperature) and a temperature of 180° C. before entering the ejector.

The second stream (cold air) had a flow rate of 450 l/h (measured at room temperature) and a temperature of 21° C. before entering the ejector.

The third stream (air+steam) had a flow rate of 700 l/h (measured at room temperature) and a temperature of about 120° C.

The temperature at which the aerosol formed in the ejector was about 85° C., while the Reynolds number in the ejector convergent portion was about 2,800. The particle size characteristics of hydrated $TiO_2$ were the following:

$D_n = 0.94$ μm;
$\delta = 0.15$;
$\delta/D_n = 0.16$;
$D_w/D_n = 1.08$

The productivity was about 5 g/h of hydrated $TiO_2$, with a yield of 50% calculated on titanium.

EXAMPLE 3

The same procedures of Example 1 were followed, except for those specifically described hereinbelow.

The first gaseous stream (air+isopropyltitanate) had a flow rate of 250 l/h (measured at room temperature) and a temperature of 128° C. before entering the ejector.

The second stream (cold air) had a flow rate of 420 l/h (measured at room temperature) and a temperature of 22° C. before entering the ejector.

The third stream (air+steam) had a flow rate of 700 l/h (measured at room temperature) and a temperature of about 120° C.

The temperature at which the aerosol formed in the ejector was about 62° C., while the Reynolds number in the ejector convergent portion was about 2,500.

The particle size characteristics of hydrated $TiO_2$ were as follows:

$D_n = 0.85$ μm;
$\delta = 0.14$;
$\delta/D_n = 0.16$;
$D_w/D_n = 1.08$

The productivity was about 3.5 g/h of hydrated $TiO_2$, with a yield of 20% calculated on titanium.

EXAMPLE 4

The same procedures of Example 1 were followed, except for those specifically described hereinbelow.

The first gaseous stream (air+isopropyltitanate) had a flow rate of 300 l/h (measured at room temperature) and a temperature of 104° C. before entering the ejector.

The second gaseous stream (cold air) had a flow rate of 300 l/h (measured at room temperature) and a temperature of 5° C. before entering the ejector.

The third gaseous stream (air+steam) had a flow rate of 320 l/h (measured at room temperature) and a temperature of about 120° C.

The temperature at which the aerosol formed in the ejector was about 55° C., while the Reynolds number in the ejector convergent portion was about 2,000.

The product characteristics were the following:

$D_n = 0.69$ μm;
$\delta = 0.11$;
$\delta/D_n = 0.16$;
$D_w/D_n = 1.08$

The productivity was approximately 3 g/h of hydrated $TiO_2$, with a yield of 35% calculated on titanium.

EXAMPLE 5

The same apparatus of Example 1 was used to produce a $ZrO_2$ powder. Isopropylzirconate diluted to 52% with n-propyl alcohol was utilized as the zirconium compound.

In a dry air stream, with a flow rate of 300 l/h (measured at room temperature), an isopropylzirconate aerosol was produced by means of a two-fluid nebulizer. The aerosol was then evaporated by externally heating the air stream. Before entering the ejector chamber, the stream had a temperature of 135° C.

A second dry air stream with a flow rate of 590 l/h (measured at room temperature) was conveyed at 21° C. into the ejector nozzle.

The temperature at which the aerosol formed in the ejector was about 59° C., while the Reynolds number in the ejector's convergent portion was about 2,300.

In a third air stream with a flow rate of about 330 l/h (measured at room temperature), a distilled water aerosol was produced by means of a second two-fluid nebulizer. The aerosol was then evaporated by externally heating the air stream before its entering the hydrolysis chamber. This stream entered the apparatus at about 120° C.

In the hydrolysis chamber, the contact time was about 41 seconds and the $$\frac{\text{moles of water}}{\text{moles of isopropylzirconate}}$$

ratio was about 12.

The gaseous stream leaving the hydrolysis chamber was externally heated to about 130° C. and the zirconium hydrated oxide was separated in three cyclones in series.

The product, examined under the electron microscope, revealed the following particle size characteristics:

$D_n = 0.26$ μm
$\delta = 0.10$
$\delta/D_n = 0.40$
$D_w/D_n = 1.44$

The particles were perfectly spherical, water-dispersible, and non-agglomerated.

The yield was approximately 30%, calculated on zirconium.

The productivity proved to be about 1 g/h of hydrated $ZrO_2$.

By calcining such product at 570° C. in a static furnace, crystalline $ZrO_2$ oxide with unaltered particle size characteristics was obtained.

EXAMPLE 6

The same apparatus of Example 1 was utilized to produce a mixture of aluminum and titanium hydrated oxides.

The starting organometallic compounds were a mixture consisting of 25% of aluminum sec. butoxide, 15% of isobutyl alcohol, and 60% of isopropyltitanate.

The same procedures of Example 5 were followed, except for those specifically described hereinbelow.

The first gaseous stream (air + organometallic compounds) had a flow rate of 410 l/h (measured at room temperature) and a temperature of 133° C. before entering the ejector.

The second gaseous stream (cold air) had a flow rate of 405 l/h (measured at room temperature) and a temperature of 14° C. before entering the ejector nozzle.

The third gaseous stream (air + stream) had a flow rate of 330 l/h (measured at room temperature) and a temperature of about 120° C.

The temperature at which the aerosol formed in the ejector was about 70° C., while the Reynolds number in the ejector's convergent portion was about 2,000.

The particle size characteristics of the powder obtained were the following:

$D_n = 0.22$ μm
$\delta = 0.08$
$\delta/D_n = 0.36$
$D_w/D_n = 1.9$

The yield was about 20%, calculated on the two metals.

In the product, the oxides were present in an $Al_2O_3/TiO_2$ weight ratio of about 1:4.

What is claimed is:

1. A process for preparing spherical, submicronic, monodispersed, and non-agglomerated particles of metal oxides by reacting with steam a gaseous stream containing an aerosol of liquid particles of a hydrolyzable metal compound of a metal selected from the class consisting of titanium, aluminum, zirconium, chromium, vanadium, gallium and iron, characterized in that into a duct, in which flows an inert gas stream containing vapors of said hydrolyzable metal compound, there is fed through a nozzle a cold inert gas stream, the temperatures and flow rates of the two gaseous streams being such as to establish in the duct a temperature lower than the condensation temperature of the said metal compound; the mixed gaseous streams having a turbulent flow in the duct with a Reynolds number equal to or higher than 1,800; and at the duct outlet, the aerosol of the said metal compound liquid particles, which has formed in the duct, is reacted with steam, wherefore solid particles of hydrated oxide of said metal form, which are then calcined to the corresponding metal oxide.

2. The process according to claim 1, characterized in that the inert gas stream containing vapors of a hydrolyzable metal compound is prepared as follows:
   an aerosol of liquid particles of the metal compound is caused to form in an inert gas stream, and the aerosol is then evaporated.

3. The process according to claim 1, characterized in that the hydrolyzable metal compound is a compound of titanium, zirconium or aluminum.

4. The process according to claim 3, characterized in that the hydrolyzable metal compound is selected from the group consisting of: isopropyltitanate, titanium ethoxide, titanium tetrachloride, aluminum sec. butoxide, aluminum ter. butoxide, aluminum n-butoxide, aluminum isobutoxide, isopropylzirconate, and zirconium-n-propoxide.

5. The process according to claim 1, characterized in that the inert gas stream containing vapors of a hydrolyzable metal compound is fed into the chamber of an ejector, while the cold inert gas stream is fed into the ejector nozzle.

6. The process according to claim 1, characterized in that, in the hydrolysis reaction, steam is used in an amount corresponding to about 1.5 to 12 times the stoichiometric ratio with respect to the hydrolyzable metal compound.

7. The process according to claim 1, characterized in that the hydrated metal oxide solid particles are separated from the gas stream prior to their calcination.

8. The process according to claim 1, characterized in that the metal oxide solid particles are separated from the gas stream after their calcination.

* * * * *